United States Patent
Ohga et al.

(10) Patent No.: US 8,220,028 B2
(45) Date of Patent: Jul. 10, 2012

(54) CONTENT TRANSMISSION APPARATUS, CONTENT RECEPTION APPARATUS, AND CONTENT TRANSMISSION/RECEPTION SYSTEM

(75) Inventors: Norio Ohga, Tokyo (JP); Satoru Maeda, Kanagawa (JP)

(73) Assignee: Sony Corporation (JP)

( * ) Notice: Subject to any disclaimer, the term of this patent is extended or adjusted under 35 U.S.C. 154(b) by 755 days.

(21) Appl. No.: 12/150,080

(22) Filed: Apr. 24, 2008

(65) Prior Publication Data

US 2008/0271099 A1    Oct. 30, 2008

(30) Foreign Application Priority Data

Apr. 27, 2007  (JP) ................ P2007-119796

(51) Int. Cl.
  *H04N 7/173*  (2011.01)
(52) U.S. Cl. ........................ 725/109; 386/200
(58) Field of Classification Search .................. None
See application file for complete search history.

(56) References Cited

U.S. PATENT DOCUMENTS

| | | | |
|---|---|---|---|
| 4,313,186 A * | 1/1982 | Yoshida | 368/22 |
| 6,119,154 A * | 9/2000 | Weaver et al. | 709/219 |
| 7,069,345 B2 * | 6/2006 | Shteyn | 709/250 |
| 2002/0059585 A1 | 5/2002 | Maeda et al. | |
| 2007/0002186 A1 | 1/2007 | Maeda et al. | |
| 2007/0107015 A1 * | 5/2007 | Kazama et al. | 725/58 |
| 2007/0240192 A1 * | 10/2007 | Acharya et al. | 725/87 |
| 2008/0196056 A1 * | 8/2008 | Bassett et al. | 725/25 |
| 2009/0276814 A1 * | 11/2009 | Tannenbaum | 725/86 |
| 2010/0319014 A1 * | 12/2010 | Lockett et al. | 725/14 |

FOREIGN PATENT DOCUMENTS

| | | |
|---|---|---|
| JP | 2001-358966 A | 12/2001 |
| JP | 2004-506308 A | 2/2004 |
| JP | 2006-211068 A | 8/2006 |
| WO | 0036835 A1 | 6/2000 |
| WO | 03/098960 A1 | 11/2003 |

OTHER PUBLICATIONS

Office Action from Japanese Application No. 2007-119796, dated Jun. 28, 2011.

* cited by examiner

*Primary Examiner* — Kristine Kincaid
*Assistant Examiner* — Oschta Montoya
(74) *Attorney, Agent, or Firm* — Lerner, David, Littenberg, Krumholz & Mentlik, LLP (57) ABSTRACT

Disclosed herein is a content transmission apparatus connected to a content reception apparatus at a remote place via a network, the content transmission apparatus including: a broadcast signal reception section configured to receive a broadcast content on one or more channels; a recording/reproducing section configured to compress and record data of at least 24 hours of broadcast content on each channel, and reproduce the recorded compressed data; a communication section configured to transmit the compressed data to the content reception apparatus via the network; and a delay control section configured to control the recording/reproducing section to control a delay time between a broadcasting time of the content and a time at which the compressed data is transmitted. The delay time is set in accordance with time difference information indicating a time difference between places where the content transmission apparatus and the content reception apparatus are placed.

7 Claims, 6 Drawing Sheets

CONTENT TRANSMISSION APPARATUS, CONTENT RECEPTION APPARATUS, AND CONTENT TRANSMISSION/RECEPTION SYSTEM

CROSS-REFERENCE TO RELATED APPLICATIONS

The present application claims priority from Japanese Patent Application No. JP 2007-119796, filed in the Japanese Patent Office on Apr. 27, 2007, the entire content of which is incorporated herein by reference.

BACKGROUND OF THE INVENTION

1. Field of the Invention

The present invention relates to a content transmission apparatus, a content reception apparatus, and a content transmission/reception system used for watching of a television broadcast.

2. Description of the Related Art

As one broadcast content delivery system, a watching system having placeshifting capability and called "LocationFree" (Registered Trademark of Sony Corporation) that allows users to watch television broadcasts with high flexibility in watching place has been put into practical use. Minimum components of the placeshifting watching system are a base station, which is a content transmission apparatus installed in a user's home, and a reception apparatus (also referred to as a LocationFree player or a client) that provides, to the user, video and audio to be watched or listened to.

When a television antenna is connected to the base station, the user is able to watch a television broadcast being broadcast anywhere in the home in real time due to a wireless communication capability of the base station. When a DVD recorder or a hard disk recorder is connected to the base station, the base station is capable of transmitting a video reproduced thereby in a wireless manner. Moreover, the base station is capable of converting a received television broadcast into a digital signal, compressing video thereof using MPEG2 (Moving Picture Experts Group Phase 2), AVC (Advanced Video Coding) (H.264), MPEG4, or the like in real time while compressing audio thereof using AAC (Advanced Audio Coding), MPEG Audio, or the like in real time, and transmitting the compressed data over the Internet. Thus, the user is able to watch the television broadcast wherever he or she is, even in a foreign country, with a reception apparatus, which receives the compressed data transmitted.

Examples of such reception apparatuses include portable game machines, personal digital assistants (PDAs), portable personal computers (laptop PCs), portable LCD monitors, mobile phones, and other portable devices. When a TV Box (a brand name used by Sony Corporation), which is capable of outputting a received broadcast content to a television receiver as a video output, is used as the reception apparatus, the user is able to watch the broadcast content with a common television receiver.

For example, WO03/098960 (Japanese Patent Application No. 2004-506308, hereinafter referred to as Patent Document 1) describes a system that allows a user to use a display apparatus that works as the reception apparatus to remotely control AV equipment connected to the base station.

SUMMARY OF THE INVENTION

The user is able to enjoy the television broadcast even in a foreign country in real time by using the placeshifting watching system as described in Patent Document 1. This usage does not pose a problem when the user enjoys the television broadcast in a country that involves almost no time difference in relation to a country where the television broadcast is broadcast. However, when the user watches the television broadcast in a country that involves a large time difference, the above usage poses a problem as the user may suffer from a disturbed life rhythm due to the time difference. For example, the user may have to watch a program of a serialized drama late at night when he or she is abroad which the user watches every morning when he or she is in a region where the base station is placed. This may disturb the life rhythm of the user.

The use of a recording apparatus connected to the base station will solve the above time-difference problem. However, scheduling for recording may be requisite for recording, which demands a cumbersome operation. Also, the user may forget to set the scheduling for recording. Moreover, the user may have to decide which program to watch before setting the scheduling for recording. Thus, the use of the recording apparatus involves a reduced convenience compared to real-time watching.

The present invention addresses the above-identified, and other problems associated with existing methods and apparatuses, and provides a content transmission apparatus, a content reception apparatus, and a content transmission/reception system that solves the above time-difference problem without the need to schedule recording of a particular broadcast, and provide a similar level of convenience to that of real-time reception.

According to one embodiment of the present invention, there is provided a content transmission apparatus connected to a content reception apparatus via a network so as to be capable of two-way communication with the content reception apparatus, the content transmission apparatus including: a broadcast signal reception section configured to receive a broadcast content on one or more channels; a recording/reproducing section configured to compress and record data of at least 24 hours of broadcast content on each channel received by the broadcast signal reception section, and reproduce the recorded compressed data; a communication section configured to transmit the compressed data reproduced by the recording/reproducing section to the content reception apparatus via the network, the content reception apparatus being at a remote place; and a delay control section configured to control the recording/reproducing section to control a delay time between a broadcasting time of the broadcast content and a time at which the compressed data is transmitted. The delay time is set in accordance with time difference information that indicates a time difference between a place where the content transmission apparatus is placed and a place where the content reception apparatus is placed.

According to another embodiment of the present invention, there is provided a content reception apparatus connected to a content transmission apparatus via a network so as to be capable of two-way communication with the content transmission apparatus, the content reception apparatus including: a communication section configured to communicate with the content transmission apparatus; an internal or external reproducing section configured to reproduce a broadcast content received from the content transmission apparatus via the network and the communication section; and a time difference setting section configured to set time difference information that indicates a time difference between a place where the content reception apparatus is placed and a place where the content transmission apparatus is placed, and transmit the set time difference information to the content transmission apparatus via the communication section and the network. A time when the broadcast content received from the content transmission apparatus is reproduced by the reproducing section is almost identical to a time when the broadcast content is broadcast in a region in which the content transmission apparatus is placed.

According to yet another embodiment of the present invention, there is provided a content transmission/reception system including: a content transmission apparatus; a network; and a content reception apparatus connected to the content transmission apparatus via the network so as to be capable of two-way communication with the content transmission apparatus. The content transmission apparatus includes: a broadcast signal reception section configured to receive a broadcast content on one or more channels; a recording/reproducing section configured to compress and record data of at least 24 hours of broadcast content on each channel received by the broadcast signal reception section, and reproduce the recorded compressed data; a first communication section configured to transmit the compressed data reproduced by the recording/reproducing section to the content reception apparatus via the network, the content reception apparatus being at a remote place; and a delay control section configured to control the recording/reproducing section to control a delay time between a broadcasting time of the broadcast content and a time at which the compressed data is transmitted. The delay time is set in accordance with time difference information that indicates a time difference between a place where the content transmission apparatus is placed and a place where the content reception apparatus is placed. The content reception apparatus includes: a second communication section configured to communicate with the content transmission apparatus; an internal or external reproducing section configured to reproduce the broadcast content received from the content transmission apparatus via the network and the second communication section; and a time difference setting section configured to set the time difference information, and transmit the set time difference information to the content transmission apparatus via the second communication section and the network. A time when the broadcast content received from the content transmission apparatus is reproduced by the reproducing section is almost identical to a time when the broadcast content is broadcast in a region in which the content transmission apparatus is placed.

According to this invention, in a region in which the content transmission apparatus (a base station) is placed, 24 hours of broadcast content on as many channels as a user desires to watch can be constantly recorded cyclically, and the broadcast content can be reproduced automatically with a delay in accordance with a local time of a region in which the user watches the broadcast content. Thus, the user is able to watch the broadcast content without his or her life rhythm being disturbed. In addition, the need for the user to perform an operation of scheduling recording of a particular broadcast content is eliminated, while the recording of the broadcast content is never neglected. Further, the user does not need to know a broadcast program to be recorded in advance.

DETAILED DESCRIPTION OF THE PREFERRED EMBODIMENT

Hereinafter, one embodiment of the present invention will be described with reference to the accompanying drawings.

Figure 1:
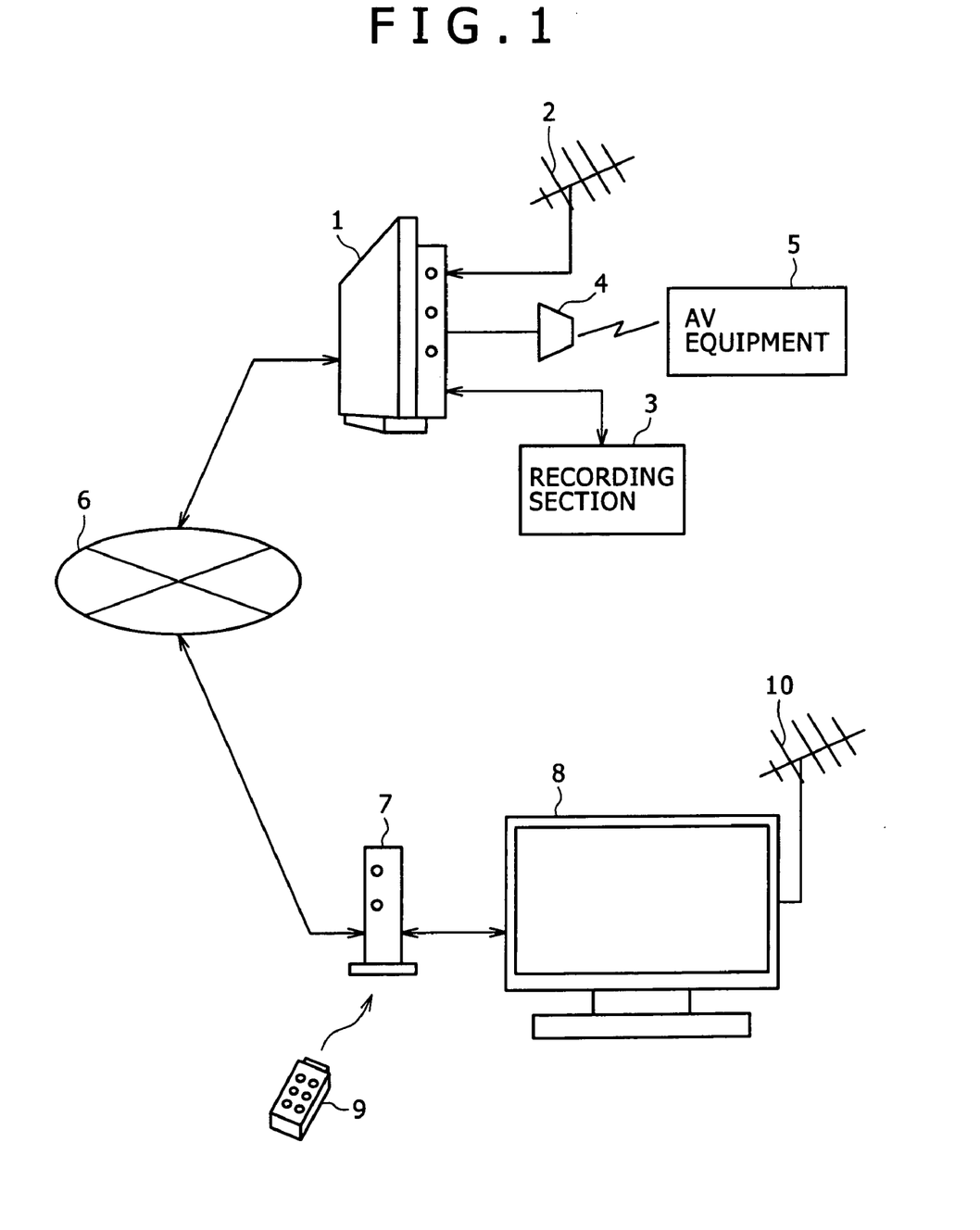
FIG. 1 is a block diagram illustrating an overall structure of a content transmission/reception system according to one embodiment of the present invention.

FIG. 1 shows an overall structure of a content transmission/reception system according to one embodiment of the present invention. A television antenna 2 is connected to a base station 1, which works as a content transmission apparatus. Thus, the base station 1 is capable of receiving a television broadcast, such as an analog television broadcast. The base station 1 may be configured to receive, instead of only the analog television broadcast, other types of broadcast contents as broadcast by digital satellite broadcasting, digital terrestrial broadcasting, cable television, Internet television, and so on.

The base station 1 has a recording section 3. The recording section 3 may be either contained in the base station 1 or externally connected to the base station 1. The recording section 3 uses a storage medium, such as a hard disk, a semiconductor memory, or an optical disk, and is configured to record broadcasts on a user-desired channel for equal to or longer than one day (24 hours) cyclically. In other words, the recording section 3 is configured to record 24 hours of broadcasts on the storage medium, and record next 24 hours of broadcasts on the storage medium by overwriting. The recording operation and a reproducing operation can be performed in parallel. The recording section 3 is capable of accepting control commands from an outside to select a channel of a reproduced output and control a delay time for the reproduced output. The recording section 3 is capable of recording 24 hours of broadcasts on all broadcast channels of analog television broadcasting, for example.

A reception apparatus (a LocationFree player or a client) is capable of remotely controlling switching of the channel of the broadcast to be sent by the base station 1, selection of the channel of the broadcast to be reproduced and outputted by the recording section 3, a delay time for sending by the recording section 3, and an operation of AV equipment 5. An AV mouse 4 is connected to the base station 1, for example, and thus the reception apparatus becomes capable of remotely controlling the operation of the AV equipment 5.

In a home, a user is able to watch a television broadcast content received and demodulated by the base station 1, using a wireless LAN. In order to allow the user to watch the broadcast content abroad, compressed data of the broadcast content is sent from the base station 1 to the Internet 6. Use of the base station 1 demands a contract with an Internet service provider (ISP), and one global IP address owed by the ISP is assigned to the base station 1.

A TV Box 7, which works as a content reception apparatus, is connected to the Internet 6. One global IP address owned by the ISP is assigned to the TV Box 7. The TV Box 7 receives the data of the broadcast content via the Internet 6, decodes the received data, and outputs the decoded data as an analog video/audio signal (hereinafter referred to simply as an "analog video signal"). The analog video signal is supplied to a video input terminal of a television receiver 8, and the user is able to watch the television broadcast transmitted from the base station 1 with the television receiver.

The TV Box 7 is capable of being remotely controlled by a remote commander 9. An antenna 10 is connected to the television receiver 8 for receiving television broadcasts of a region where the television receiver 8 is placed. A common television receiver is used as a display.

With the television receiver 8, the user is able to watch a broadcast provided from the base station 1 in real time as well as a television broadcast provided in the region where it is placed. Moreover, using a function of the TV Box 7, the display of the television receiver 8, and the commander 9, the user is able to generate data for configuring the base station 1, or the recording section 3, the AV equipment 5, or the like connected to the base station 1, and is also able to remotely control such devices.

Figure 2:
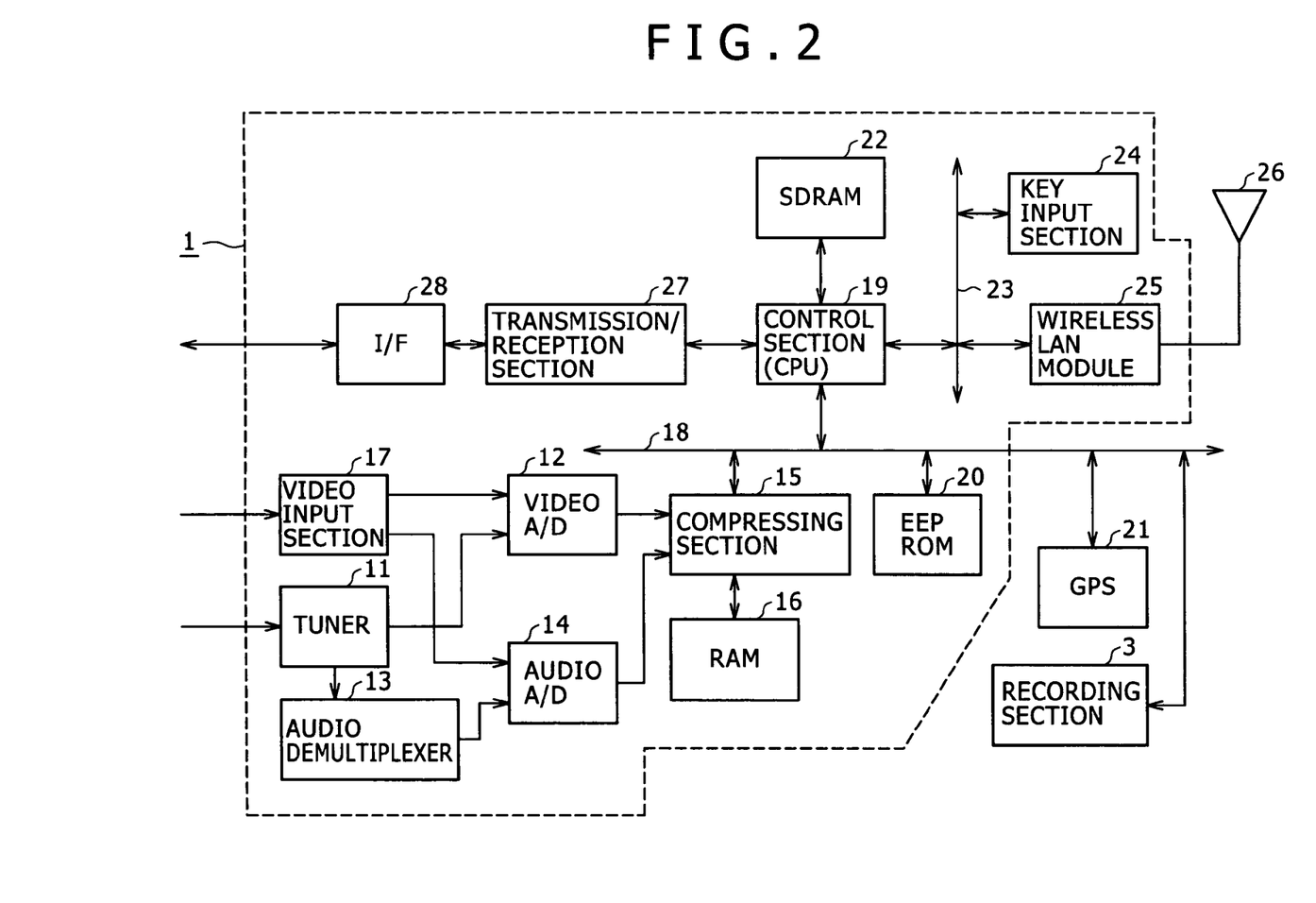
FIG. 2 is a block diagram illustrating a structure of a base station according to one embodiment of the present invention.

Referring to FIG. 2, an exemplary structure of the base station 1 will now be described below. A television signal received by the antenna 2 is supplied to a tuner 11. One example of the tuner 11 is an analog television tuner. The tuner 11 demodulates the television signal to obtain a video signal, and the video signal is converted by a video A/D converter 12 to a digital video signal. A sound intermediate-frequency signal extracted by the tuner 11 is supplied to an audio demultiplexer 13, where an analog audio signal is obtained. The analog audio signal is converted by an audio A/D converter 14 to a digital audio signal.

The digital video signal and the digital audio signal are supplied to a compressing section 15, and the compressing section 15 compresses the digital video signal and the digital audio signal. MPEG2, MPEG4, AVC (Advanced Video Coding), AAC, MPEG Audio, VC-1, and the like can be used for compression. A RAM 16 used for compression is connected to the compressing section 15.

The base station 1 has a composite video or component video input section 17, and thus is capable of accepting input of an analog video signal from an external device. For example, video signals can be inputted to the base station 1 from a communication satellite (CS) tuner, a cable television (CATV) receiver, a digital terrestrial tuner, an imaging device, a digital versatile disc (DVD) player, a videocassette recorder, and so on.

The video signal supplied via the video input section 17 is converted by the video A/D converter 12 to a digital video signal, and an analog audio signal supplied via the video input section 17 is converted by the audio A/D converter 14 to a digital audio signal. Then, the digital video signal and the digital audio signal are compressed by the compressing section 15.

The compressed data is outputted from the compressing section 15 to a local bus 18. A control section 19, an electrical erasable programmable ROM (EEPROM) 20 as a nonvolatile memory, a global positioning system (GPS) 21, and the recording section 3 are connected to the local bus 18.

The EEPROM 20 stores information about a broadcast channel that is selected up to a main power of the base station 1 being turned off, for example. This enables a broadcast signal of the channel selected up to the previous turn-off of the power to be selected when the power is turned on next. In addition, the EEPROM 20 stores data related to remote control delivered from a predetermined website on the Internet.

The recording section 3 records the compressed data, or reproduces the compressed data and outputs the reproduced compressed data to the control section 19 via the local bus 18. As described below, the recording section 3 is capable of recording programs broadcast on one or more channels, and the channel and the delay time when the recording section 3 sends the reproduced output can be set by an external device.

The GPS 21 outputs data of position information (i.e., latitude and longitude information) of the region at which the base station 1 is placed to the control section 19 via the local bus 18. The GPS 21 may be capable of acquiring time information in addition to the position information. In this case, the GPS 21 may output the time information to the control section 19. This time information can be used to obtain time difference information.

The compressed data outputted from the compressing section 15 or the compressed data reproduced by the recording section 3 is supplied to the control section 19 via the local bus 18. The control section 19 includes a central processing unit (CPU), a read only memory (ROM) having a control program stored therein, and a random access memory (RAM) for storing various types of data. A synchronous dynamic random access memory (SDRAM) 22 is connected to the control section 19. The control section 19 controls each part of the base station 1 by reading the program or data stored in the ROM as demanded and using the RAM as a work memory.

A key input section 24, which is composed of a power switch and so on, and a wireless local area network (LAN) module 25 are connected to a CPU bus 23, which is connected to the CPU in the control section 19. An antenna 26 is connected to the wireless LAN module 25. The wireless LAN module 25 includes a transmission section and a reception section, and performs a transmission process and a reception process so as to conform to a predetermined communications protocol. The wireless LAN module 25 in the base station 1 supports three standards, IEEE (Institute of Electrical and Electronics Engineers) 802.11b/g/a, as wireless LAN systems, for example.

Within coverage of the wireless LAN, it is possible to receive, in a wireless manner, the compressed data as compressed by the compressing section 15 in the base station 1. The compressed data corresponds to the television signal outputted from the tuner 11 or the video signal supplied to the video input 17. A signal reproduced by the recording section 3 may be transmitted via the wireless LAN as necessary. Accordingly, the user is able to watch the television broadcast with a reception apparatus (a mobile device) placed in a room different from a room in which the base station 1 is placed in the home, for example. Meanwhile, the base station 1 is capable of receiving a control signal related to a channel selection instruction or the like from the reception apparatus via the wireless LAN module 25. The received control signal is supplied to the control section 19.

Further, a transmission/reception section 27 is connected to the control section 19. An interface 28 is connected to the transmission/reception section 27. The interface 28 is used to connect the base station 1 to a broadband Internet line via a broadband router. In the case of Ethernet (registered trademark), for example, the transmission/reception section 27 performs the transmission and reception processes so as to conform to the standard, while a LAN cable is connected to the base station 1 via an RJ-45 modular jack used as the interface 28.

When the base station 1 is connected to the Internet line, the user is able to watch the television broadcast in real time with the reception apparatus (e.g., the TV Box 7) even when the user is outside his or her home, even in a foreign country, for example. In this case, as described below, the user is able to watch the television broadcast (i.e., the signal reproduced by the recording section 3) as delayed in accordance with a time difference between the region in which the base station 1 is placed and a region in which the user watches the television broadcast with the TV Box 7. Moreover, the base station 1 is capable of receiving remote control data from the TV Box 7 via the Internet line so that the base station 1 and the AV equipment connected to the base station 1 can be remotely controlled by the TV Box 7. Still further, the base station 1 can be connected to a predetermined website via the Internet line so that the data related to remote control, software data, and so on can be downloaded from this website to the base station 1. Still further, viewing of websites on the Internet and reception of electronic mails are also possible.

In the base station 1 described above, the signal outputted from the tuner 11 or the video signal outputted from the video input 17 is selected by the control section 19, and one channel is also selected. The video signal or the broadcast signal of the selected channel is compressed by the compressing section 15. The resulting compressed data is transmitted via the control section 19, the wireless LAN module 25, and the antenna 26, so that the reception apparatus can receive the compressed data via the wireless LAN to allow the user to watch the television broadcast or the video signal. The compressed data can also be transmitted to the TV Box 7 via the control section 19, the transmission/reception section 27, the interface 28, the broadband router (not shown), and the Internet line, so that the user can watch the television broadcast or the video signal with the television receiver connected to the TV Box 7.

For the sake of simplicity, only components (i.e., the tuner 11, the video A/D converter 12, the audio demultiplexer 13, the audio A/D converter 14, the compressing section 15, and the RAM 16) necessary for real-time reception are shown in FIG. 2. As noted previously, the recording section 3 is used to cyclically record equal to or longer than 24 hours of television broadcasts on as many channels as desired by the user.

Figure 3:
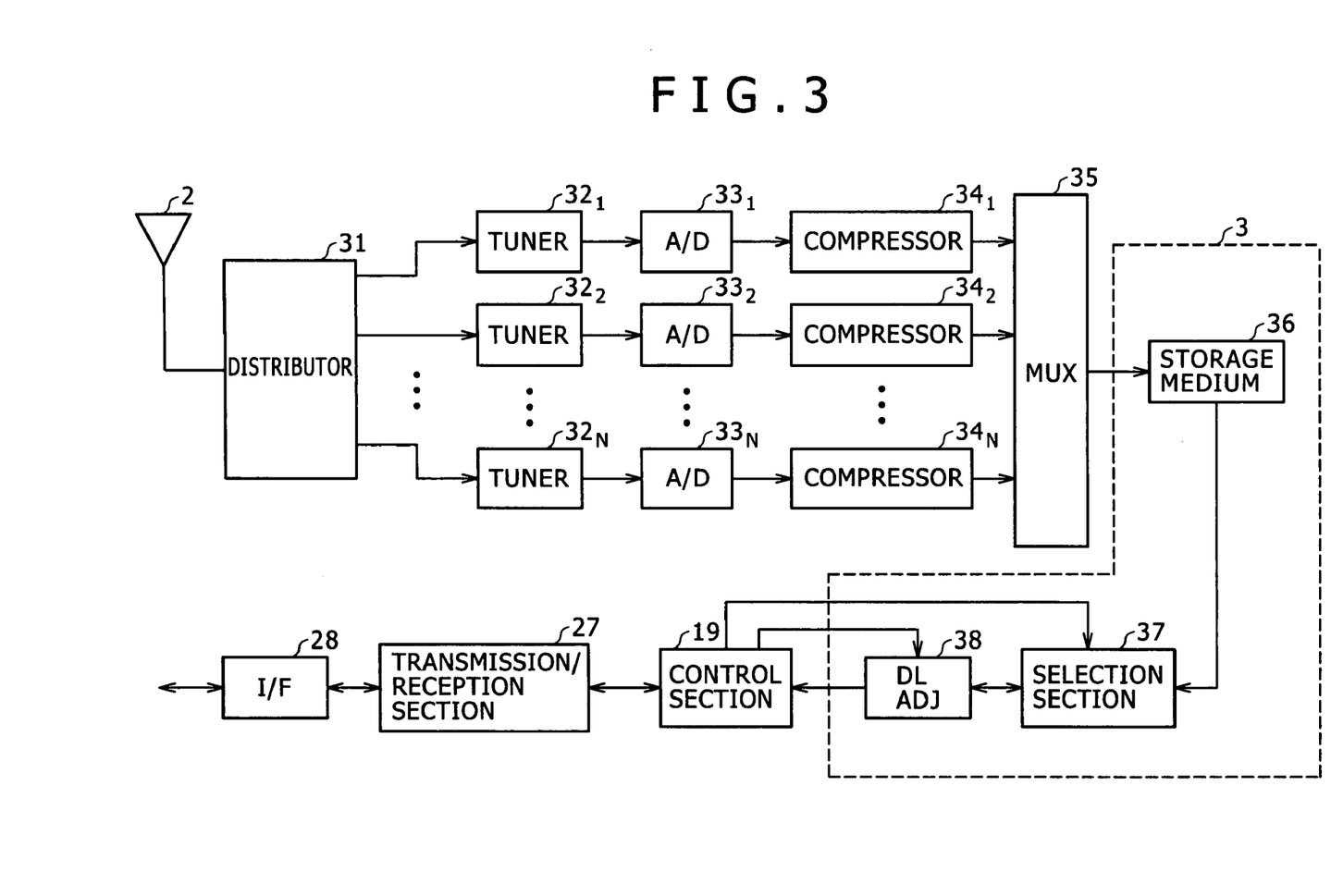
FIG. 3 is a block diagram illustrating a structure, relating to a recording section, of the base station according to one embodiment of the present invention.

FIG. 3 shows an exemplary structure for performing such recording. The signal received by the antenna 2 is supplied by a distributor 31 to tuners $32_1$, $32_2$, ..., and $32_N$. The number N of tuners corresponds to the number of all analog television channels that can be received in the region in which the base station 1 is placed, for example. Video signals and audio signals outputted from the tuners $32_1$ to $32_N$ are converted by A/D converters $33_1$ to $33_N$, respectively, to digital video and audio signals.

The digital video and audio signals are supplied to compressors $34_1$ to $34_N$ and compressed thereby. The resulting compressed data (a data stream) outputted from each of the compressors $34_1$ to $34_N$ is supplied to a multiplexer 35. The number N corresponds to the number of all analog television channels that can be received, for example. The multiplexer 35 converts N channels of streams into an appropriate number of recording channels to supply them to the recording section 3. The N channels of streams may be supplied to the recording section 3 without the provision of the multiplexer 35.

The recording section 3 includes a storage medium 36, a selection section 37, and a delay adjustment section 38. In the recording section 3, the compressed data of each channel is recorded cyclically on the storage medium 36. For example, when recording of 24 hours of data is complete concerning one particular channel, a recording address returns to a start address, whereafter data previously recorded is overwritten by new data to be recorded sequentially. The above recording operation is constantly performed by the recording section 3, and thus 24 hours of broadcasts on all channels, for example, are recorded constantly. Note that the length of 24 hours is a minimum recording time, and that the recording section 3 may be configured to record data of a longer length of time, such as several days or one week.

In parallel with recording, the compressed data is reproduced from the storage medium 36. At the time of reproducing the compressed data, the compressed data of one channel is selected by the selection section 37 from among the compressed data of the N channels. A delay time concerning the compressed data of the one channel selected by the selection section 37 is set in the delay adjustment section 38.

A selection control signal is supplied from the control section 19 to the selection section 37 in order for the selection section 37 to select the compressed data of the one channel among the N channels. The user performs an operation of specifying a channel that the user desires to watch on the TV Box 7 as the reception apparatus, and the selection control signal is transmitted from the TV Box 7 to the base station 1 via the Internet line for selecting the specified channel. Along with this selection control signal, the time difference information is transmitted from the TV Box 7 to the base station 1.

The control section 19 generates a delay time control signal based on the time difference information transmitted from the TV Box 7, and the delay time is set in the delay adjustment section 38 based on the delay time control signal. In accordance with the delay time control signal, the delay adjustment section 38 outputs the reproduced signal with a delay time of a maximum of 24 hours relative to an actual broadcasting time in the region where the base station 1 is placed. In the case where the time difference information indicates 19 hours, for example, the delay adjustment section 38 outputs the reproduced signal with a delay time of 19 hours relative to the actual broadcasting time. When the delay adjustment section 38 sets a zero delay time, the user is able to watch the television broadcast almost in real time with the TV Box 7. The setting of the delay time is achieved by the recording section 3 sequentially reproducing the compressed data, starting with that of a program that was broadcast a length of time ago corresponding to the time difference among that of programs previously recorded.

The compressed data corresponding to the selected channel and which has been subjected to delay time adjustment is supplied to the transmission/reception section 27 via the control section 19. The compressed data is outputted to the Internet via the transmission/reception section 27, the interface 28, and the broadband router (not shown).

Figure 4:
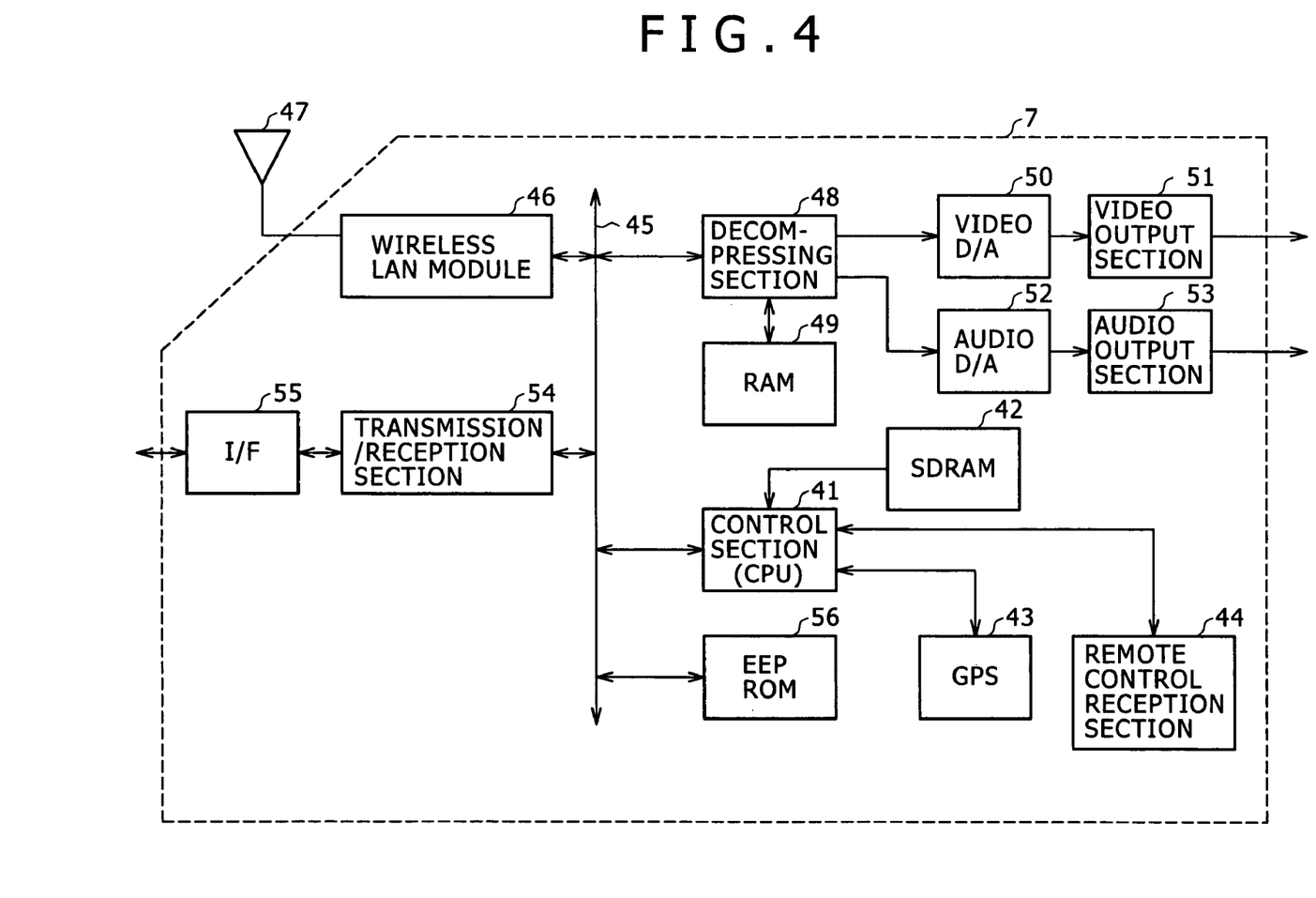
FIG. 4 is a block diagram illustrating a structure of a TV Box, which is an example of a reception apparatus according to one embodiment of the present invention.

Next, referring to FIG. 4, the TV Box 7, which is an example of the reception apparatus, will now be described below. The TV Box 7 includes a control section 41. The control section 41 includes a CPU, a ROM having a control program stored therein, and a RAM for storing various types of data. An SDRAM 42, a GPS 43, and a remote control reception section 44 are connected to the control section 41. A remote control system uses infrared communication, for example. Various other types of remote control systems, such as that which uses wireless communication or that which uses a touch panel, are also applicable. The control section 41 controls each part of the TV Box 7 by reading the program or data stored in the ROM as demanded and using the RAM as a work memory.

A wireless local area network (LAN) module 46 is connected to a bus 45, which is connected to the CPU in the control section 41. An antenna 47 is connected to the wireless LAN module 46. The wireless LAN module 46 includes a transmission section and a reception section, and performs a transmission process and a reception process so as to conform to a predetermined communications protocol. As with the wireless LAN module 25 in the base station 1, the wireless LAN module 46 supports the three standards, IEEE 802.11b/g/a, as the wireless LAN systems.

In the case where the base station 1 and the TV Box 7 are placed in the same home, or in a similar case, the TV Box 7 is capable of receiving the compressed data from the base station 1 within the coverage of the wireless LAN. The compressed data corresponds to either the television signal selected by the tuner 11 in the base station 1 or the video signal supplied to the video input 17. The signal reproduced by the recording section 3 may be received via the wireless LAN for the TV Box 7 as necessary.

The compressed data received by the wireless LAN module 46 is supplied to the control section 41 via the bus 45, and then supplied from the control section 41 to a decompressing section 48. The decompressing section 48 has a RAM 49 used for processing. The decompressing section 48 performs a process of decompressing the data compressed by the compressing section 15 in the base station 1. This decompressing process may be performed by the control section 41.

A video signal resultant from the decompression is supplied from the decompressing section 48 to a video output section 51 via a video D/A converter 50, while an audio signal resultant from the decompression is supplied from the decompressing section 48 to an audio output section 53 via an audio D/A converter 52. The video signal and the audio signal are supplied from the video output section 51 and the audio output section 53, respectively, to the television receiver 8 (see FIG. 1), and played by the television receiver 8. Thus, in the home, for example, the user is able to watch the television broadcast with the TV Box 7 (i.e., the reception apparatus), which is placed in a different room from the room in which the base station 1 is placed.

The TV Box 7 may output the signal to the television receiver 8 in another form such as that of a composite video signal. A display signal that is generated by the control section 41 in the TV Box 7 and used for presenting a display related to remote control is superimposed upon the video signal by an on-screen display control section (not shown). Thus, a display related to various types of settings or remote control is presented on a screen of the television receiver 8. The user is able to perform various types of settings and remote control by operating the commander 9 (see FIG. 1). The control signal related to the channel selection instruction or the like is transmitted from the TV Box 7 to the base station 1 via the wireless LAN module 46 and the antenna 47.

Further, a transmission/reception section 54 is connected to the control section 41 via the bus 45, and an interface 55 is connected to the transmission/reception section 54. The interface 55 is used to connect the TV Box 7 to the broadband Internet line via the broadband router. In the case of the Ethernet (registered trademark), for example, the transmission/reception section 54 performs transmission and reception processes so as to conform to the standard, while a LAN cable is connected to the TV Box 7 via the interface 55 (e.g., an RJ-45 modular jack).

The compressed data is supplied from the base station 1 to the broadband router (not shown) via the Internet line, then to the control section 41 via the interface 55 and the transmission/reception section 54, and then to the decompressing section 48. The video signal and the audio signal are obtained by the decompressing process in the decompressing section 48, and the video and audio signals are supplied to the television receiver 8 via the video D/A converter 50, the audio D/A converter 52, the video output section 51, and the audio output section 53, and played by the television receiver 8.

In the TV Box 7, an EEPROM 56 is connected to the bus 45. The EEPROM 56 is a nonvolatile memory, and used to store various types of setting parameters. In the case where the TV Box 7 has electronic mail functionality, the EEPROM 56 stores a created electronic mail, a received electronic mail, and so on. Control data used for remote control is provided by application software installed. The EEPROM 56 may further store control data used for remote control which has been transmitted from the base station 1. Using this control data, an operation screen can be displayed on the screen of the television receiver 8.

As described above, when the TV Box 7 is connected to the Internet line and the TV Box 7 is connected to the television receiver 8, the user is able to watch the television broadcast, which is transmitted from the base station 1, with the television receiver 8 in real time even in a foreign country, for example. In addition, the user is able to change the selected channel by operating the remote commander 9 for the TV Box 7. Note, however, that when there is a time difference between the region in which the base station 1 is placed and the region in which the TV Box 7 is placed, life rhythm of the user may be disturbed as the user watches the television broadcast in a different time period from its usual time period.

In this embodiment of the present invention, in order to solve the above problem, the time difference information is set in the TV Box 7, and the time difference information is transmitted to the base station 1. In the base station 1, the control section 19 generates the delay time control signal based on the time difference information received, and the delay time control signal is supplied to the delay adjustment section 38 (see FIG. 3), so that the television signal is outputted with a delay time corresponding to the time difference indicated by the time difference information.

For example, suppose that the base station 1 is placed in Japan and the TV Box 7 is placed in Vietnam. The time difference between the two countries is two hours. When a program broadcast at 7 am in Japan is sent in real time from Japan to Vietnam, the user in Vietnam, where the TV Box 7 is placed, will watch this program at 5 am. In contrast, when data of this program is sent at 9 am with a delay of two hours, corresponding to the time difference, the user in Vietnam will be able to watch this program at the same time (i.e., 7 am) as a time at which people in Japan watch this program. That is, the user is able to watch the program while maintaining the life rhythm that the user had when he or she was in Japan.

Figure 5A:
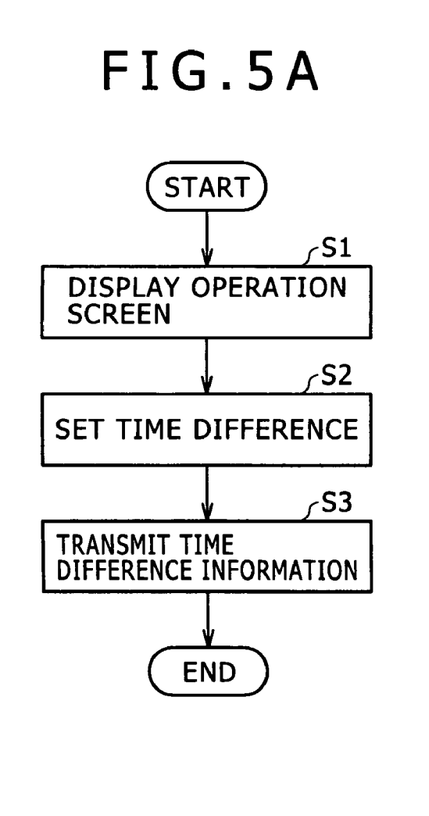
FIGS. 5A to 5C are flowcharts illustrating flows of time difference setting procedures according to one embodiment of the present invention.

The setting of the time difference in the TV Box 7 will now be described below. Three examples of methods of setting the time difference information will be described below with reference to FIGS. 5A to 5C. FIG. 5A shows a method in which the time difference is set in the TV Box 7 under control of the control section 41 by a manual operation by the user. At step S1, an operation screen used for time difference setting is displayed on the screen of the television receiver 8. The operation screen used for time difference setting is displayed, for example, when the television receiver 8, in a normal receiving state, has been caused to operate as the reception apparatus for the base station 1 and display a menu screen for settings, and a time difference setting menu in the menu screen has been selected. The display of the operation screen, acceptance of an operation input from the commander 9, a control operation in accordance with the operation input, and so on are performed under control of the control section 41 in the TV Box 7.

Figure 6A:
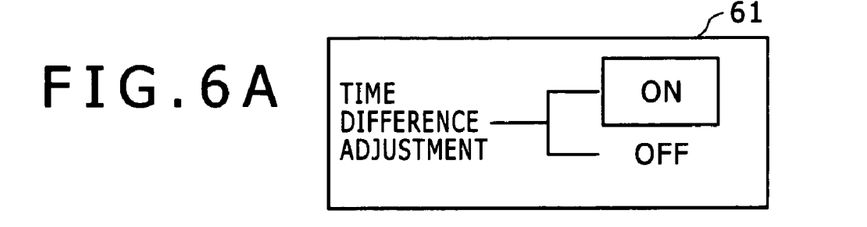
FIGS. 6A and 6B are illustrations of examples of operation screens according to one embodiment of the present invention.

FIG. 6A shows an example of an operation screen 61. With the operation screen 61, it is possible to configure whether to perform time difference adjustment. When the time difference adjustment should be performed, "ON" is selected, while when the time difference adjustment should not be performed, "OFF" is selected. The selection of "ON" or "OFF" can be performed by operating a direction (cross) key and an enter key of the remote commander 9, for example.

Figure 6B:
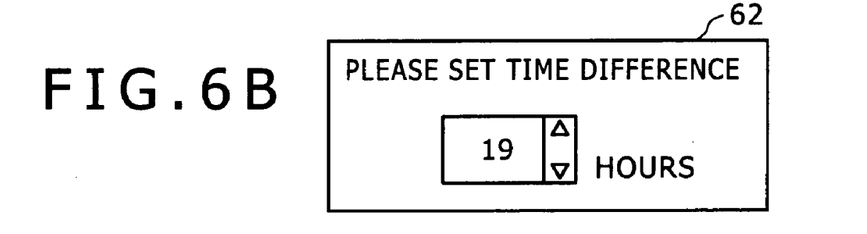

At step S2, the time difference is set. As shown in FIG. 6B, a value of the time difference can be increased or decreased by placing a cursor on an up mark or a down mark and pressing an up key or a down key. When daylight saving time is in effect, for example, the time difference between Hawaii and Japan is 19 hours.

After the setting of the time difference is completed, a signal for controlling On/Off of the time difference adjustment and the time difference information are transmitted to the base station 1 at step S3. The signal for controlling On/Off of the time difference adjustment and the time difference information are transmitted as a result of pressing the enter key of the commander 9 after setting the time difference, for example. These control signals are transmitted to the base station 1 via the transmission/reception section 54 and the interface 55 of the TV Box 7.

Figure 5B:
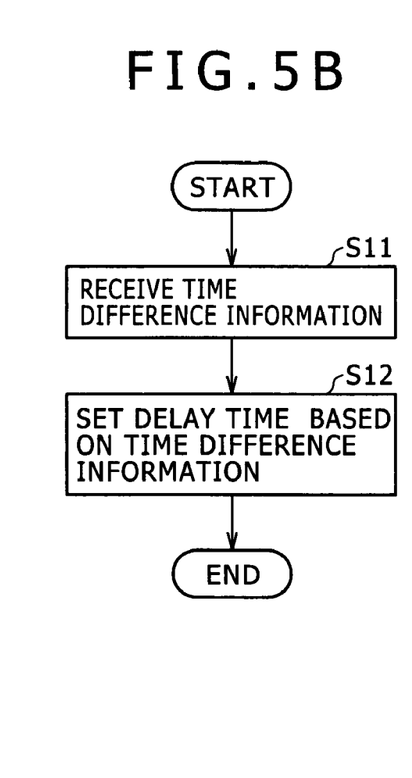

At the base station 1, a procedure as shown in FIG. 5B is performed under control of the control section 19. At step S11, the control section 19 receives the signal for controlling On/Off of the time difference adjustment and the time difference information via the interface 28 and the transmission/reception section 27. At step S12, the delay time when the signal reproduced from the recording section 3 is sent to the TV Box 7 is set based on the received time difference information. For example, the delay time at the delay adjustment section 38 as shown in FIG. 3 is set based on the time difference information. In the case where a local time at the region where the TV Box 7 is placed is behind a local time at the region where the base station 1 is placed, the delay time to be set is almost equal to the time difference.

In the case where a control signal for disabling the time difference adjustment has been received from the TV Box 7, the base station 1 is configured to send a signal of the television broadcast outputted from the tuner 11. In this case, a minimum (i.e., 0) delay time may be set in the delay adjustment section 38.

Figure 7A:
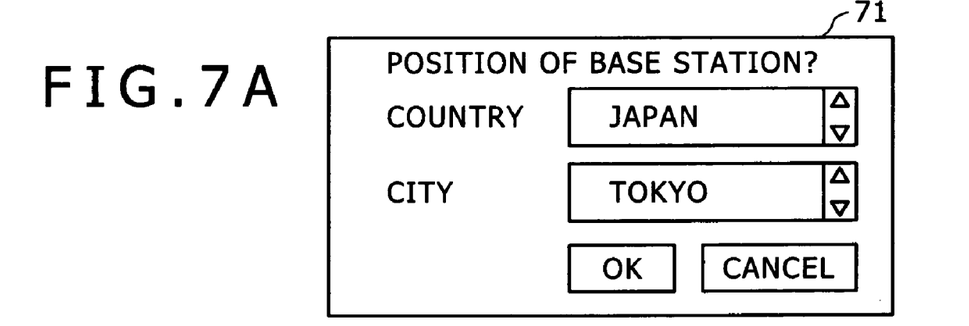
FIGS. 7A and 7B are illustrations of other examples of operation screens according to one embodiment of the present invention.
Figure 7B:
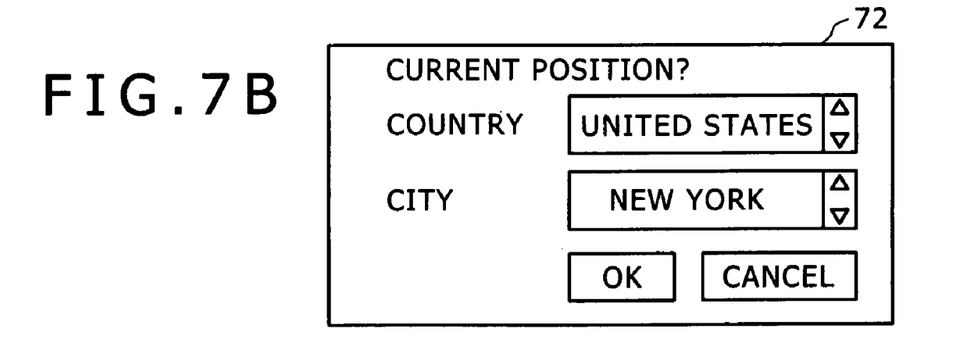

Various other types of operation screens for time difference setting are applicable than those as shown in FIGS. 6A and 6B. For example, as shown in FIGS. 7A and 7B, the time difference may be set by operating an operation screen 71 for setting names of a country and a city where the base station 1 is placed and an operation screen 72 for setting names of a country and a city (i.e., a current position) where the TV Box 7 is placed sequentially. Only the name of the country may be specified. Moreover, a world map may be displayed so that position specification is performed on the world map. With such a method, the user is able to set the time difference even when the user does not know the time difference between the two regions.

The local time at the region where the TV Box 7 is placed is not always behind, but may be ahead of, the local time at the region where the base station 1 is placed. For example, relative to Japan time, a local time at New Zealand is 3 hours ahead. In this case, assuming that the base station 1 is placed in Japan and the TV Box 7 is placed in New Zealand, the delay time is set to 21 (=24−3) hours. For example, 21 hours after 7 am is 4 am. Therefore, if a television program broadcast at 7 am (Japan time) in Japan is sent to New Zealand at 4 am (Japan time), the user in New Zealand can watch this program at 7 am (New Zealand time). That is, in the case where the user desires to watch a television program broadcast in a region whose local time is behind a local time at a region in which the user currently is, the delay time may be set at a time obtained by subtracting an amount of the time difference from 24 hours. An operation screen 62 used for time difference setting may be designed considering the above. For example, the operation screen 62 may be designed to allow the user to specify "+" or "−" with respect to the time difference.

Figure 5C:
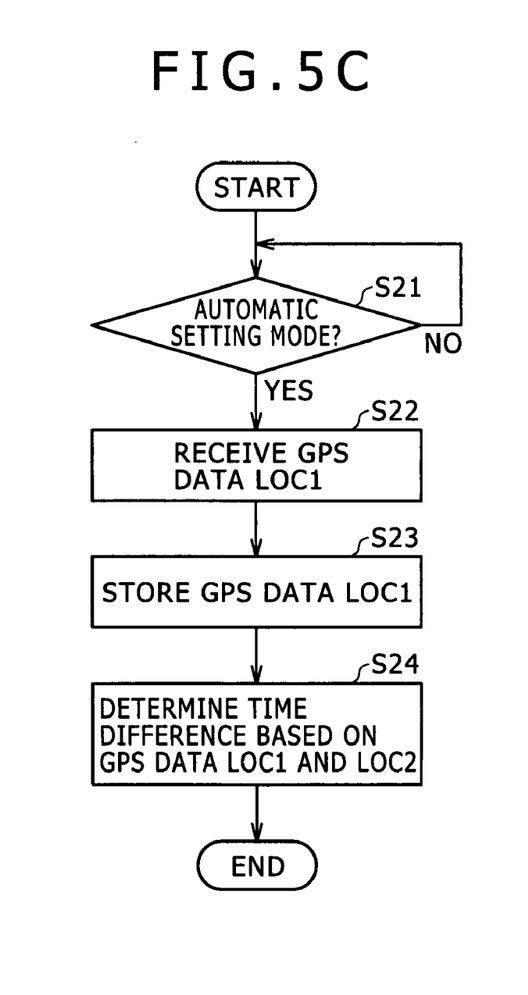

FIG. 5C is a flowchart illustrating an exemplary procedure in which the setting of the time difference is performed automatically in the TV Box 7. At step S21, it is determined whether an automatic setting mode is in effect. If it is determined that the automatic setting mode is in effect, GPS data LOC1 (i.e., the position information) is received from the GPS 21 in the base station 1 at step S22. At step S23, the received GPS data LOC1 is stored.

At step S24, the time difference is determined based on the stored GPS data LOC1 received from the base station 1 and GPS data LOC2 obtained by the GPS 43 in the TV Box 7 itself. For example, a table previously prepared may be used to translate each of the GPS data LOC1 and LOC2 into country information, thereby determining the time difference. The time difference information obtained is transmitted to the base station 1.

Automatic setting of the time difference may be performed in the following manner. That is, the base station 1 receives the GPS data from the TV Box 7 to determine the time difference using the received GPS data and the GPS data obtained in the base station 1 itself. Moreover, the GPS may be contained in only the TV Box 7. In this case, if the region (e.g., a country name) in which the base station 1 is placed is initially set in the TV Box 7, the time difference can be determined based on the position information detected by the GPS in the TV Box 7 alone. Further, it is possible that information of the region in which the TV Box 7 is placed may be inputted by a manual operation, and the inputted region information may be transmitted to the base station 1. In this case, if the region in which the base station 1 is placed is set previously, the time difference information can be acquired in the base station 1.

While one embodiment of the present invention has been described above, the present invention is not limited to this embodiment. It should be understood by those skilled in the art that various modifications, combinations, sub-combinations and alterations may occur depending on design requirements and other factors insofar as they are within the scope of the appended claims or the equivalents thereof. For example, other devices than the combination of the TV Box and the common television receiver can be used as the reception apparatus. For example, devices that are capable of receiving and playing the broadcast content, such as a portable display apparatus having a liquid crystal display, a portable personal computer, and a portable game machine, can be used as the reception apparatus.

What is claimed is:

1. A content transmission apparatus connectable to a content reception apparatus via a network so as to be capable of two-way communication with the content reception apparatus, the content transmission apparatus comprising:

a broadcast signal reception section configured to receive a broadcast content on one or more channels;

a recording/reproducing section configured to compress and cyclically record data of a selected length of time of a plurality of selectable lengths of time of broadcast content on each channel received by said broadcast signal reception section, wherein each of the selectable lengths of time is at least 24 hours, such that the data of selected lengths of time of the plurality of selectable lengths of time of broadcast content, respectively, for all channels which are received by said broadcast signal reception section are constantly recorded from respective start addresses and, when recording from a first start address of data of a previous selected length of time of the plurality of selectable lengths of time of broadcast content for a first channel of the channels which is received by said broadcast signal reception section is completed, data of at least next selected length of time of the plurality of selectable lengths of time of broadcast content for the first channel which is received by said broadcast signal reception section are overwritten on the data of the previous selected length of time of broadcast content for the first channel from the first start address, and reproduce the recorded compressed data;

a communication section configured to transmit the compressed data reproduced by said recording/reproducing section to the content reception apparatus via the network, the content reception apparatus being at a remote place; and a delay control section configured to control said recording/reproducing section to control a delay time between a broadcasting time of the broadcast content and a time at which the compressed data is transmitted, wherein the delay time is set in accordance with time difference information that indicates a time difference between a place where the content transmission apparatus is placed and a place where the content reception apparatus is placed.

2. The content transmission apparatus according to claim 1, wherein the time difference information is transmitted from the content reception apparatus.

3. The content transmission apparatus according to claim 1, wherein region information that indicates a region in which the content reception apparatus is placed is transmitted from the content reception apparatus, and the time difference information is generated based on the region information.

4. The content transmission apparatus according to claim 1, wherein a channel of a broadcast content to be transmitted to the content reception apparatus is selected based on a control signal transmitted from the content reception apparatus.

5. The content transmission apparatus according to claim 1, wherein, when a local time at the place where the content reception apparatus is placed is ahead of a local time at the place where the content transmission apparatus is placed, a time obtained by subtracting the time difference from 24 hours is set as the time difference information.

6. A content transmission/reception system, comprising:
a content transmission apparatus;
a network; and
a content reception apparatus connected to said content transmission apparatus via said network so as to be capable of two-way communication with said content transmission apparatus; wherein said content transmission apparatus includes a broadcast signal reception section configured to receive a broadcast content on one or more channels, a recording/reproducing section configured to compress and cyclically record data of a selected length of time of a plurality of selectable lengths of time of broadcast content on each channel received by the broadcast signal reception section, wherein each of the selectable lengths of time is at least 24 hours, such that the data of selected lengths of time of the plurality of selectable lengths of time of broadcast content, respectively, for all channels which are received by said broadcast signal reception section are constantly recorded from respective start addresses and, when recording from a first start address of data of a previous selected length of time of the plurality of selectable lengths of time of broadcast content for a first channel of the channels which is received by said broadcast signal reception section is completed, data of at least selected length of time of the plurality of selectable lengths of time of broadcast content for the first channel which is received by said broadcast signal reception section are overwritten on the data of the previous selected length of time of broadcast content for the first channel from the first start address, and reproduce the recorded compressed data, a first communication section configured to transmit the compressed data reproduced by the recording/reproducing section to said content reception apparatus via said network, said content reception apparatus being at a remote place, and a delay control section configured to control the recording/reproducing section to control a delay time between a broadcasting time of the broadcast content and a time at which the compressed data is transmitted, the delay time is set in accordance with time difference information that indicates a time difference between a place where said content transmission apparatus is placed and a place where said content reception apparatus is placed, said content reception apparatus includes a second communication section configured to communicate with said content transmission apparatus, an internal or external reproducing section configured to reproduce the broadcast content received from said content transmission apparatus via said network and the second communication section, and a time difference setting section configured to set the time difference information, and transmit the set time difference information to said content transmission apparatus via the second communication section and said network, a time when the broadcast content received from said content transmission apparatus is reproduced by the reproducing section is almost identical to a time when the broadcast content is broadcast in a region in which said content transmission apparatus is placed.

7. A content transmission apparatus connectable to a content reception apparatus via a network so as to be capable of two-way communication with the content reception apparatus, the content transmission apparatus comprising:

broadcast signal reception means for receiving a broadcast content on one or more channels;

recording/reproducing means for compressing and cyclically recording data of a selected length of time of a plurality of selectable lengths of time of broadcast content on each channel received by said broadcast signal reception means, wherein each of the selectable lengths of time is at least 24 hours, such that the data of selected lengths of time of the plurality of selectable lengths of time of broadcast content, respectively, for all channels which are received by said broadcast signal reception means are constantly recorded from respective start addresses and, when recording from a first start address of data of a previous selected length of time of the plurality of selectable lengths of time of broadcast content for a first channel of the channels which is received by said broadcast signal reception section is completed, data of at least next selected length of time of the plurality of selectable lengths of time of broadcast content for the first channel which is received by said broadcast signal reception means are overwritten on the data of the previous selected length of time of broadcast content for the first channel from the first start address, and reproducing the recorded compressed data;

communication means for transmitting the compressed data reproduced by said recording/reproducing means to the content reception apparatus via the network, the content reception apparatus being at a remote place; and delay control means for controlling said recording/reproducing means to control a delay time between a broadcasting time of the broadcast content and a time at which the compressed data is transmitted, wherein the delay time is set in accordance with time difference information that indicates a time difference between a place where the content transmission apparatus is placed and a place where the content reception apparatus is placed.

* * * * *